Sept. 2, 1969
G. ORLOFF
3,464,316
FLUID SERVO MOTORS
Original Filed April 25, 1967
2 Sheets-Sheet 1
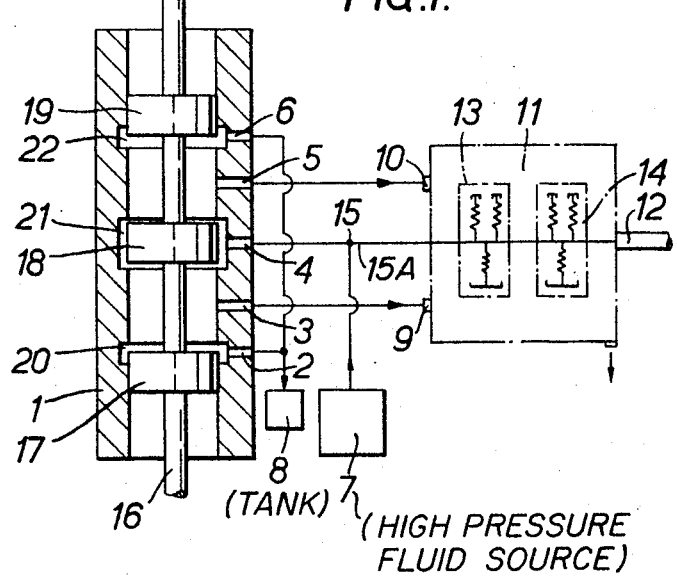
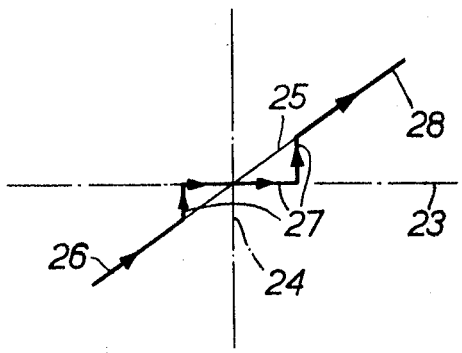
Inventor
George Orloff
by
Watson, Cole, Grindle & Watson
Attorneys

United States Patent Office 3,464,316
Patented Sept. 2, 1969

3,464,316
FLUID SERVO MOTORS
George Orloff, London, England, assignor to Molins Machine Company Limited, London, England, a corporation of Great Britain
Continuation of application Ser. No. 633,583, Apr. 25, 1967. This application July 1, 1968, Ser. No. 745,075.
Claims priority, application Great Britain, May 6, 1966, 20,186/66
Int. Cl. F01b *13/06;* F15b *11/16, 13/06*
U.S. Cl. 91—176                                           9 Claims

ABSTRACT OF THE DISCLOSURE

A hydraulic servo system comprises a high pressure fluid source connected to a T junction one arm of which communicates with a servo spool valve whose movement affects rotation of a servo ball motor rotor mounted on a pintle through fluid connections between valve and motor, the other arm of the T junction communicating with channels in the pintle providing hydrostatic bearings between rotor and pintle.

---

This application is a continuation of my application Ser. No. 633,583, filed Apr. 25, 1967, now abandoned.

This invention concerns improvements relating to hydraulic servo systems and in particular to a system in which a rotary servo motor receives a differential flow from a pressure source through a servo valve.

Servo motors differ from ordinary hydraulic motors in that the fluid input causing rotational output frequently takes the form of a small differential pressure swing about a standing high pressure. The configuration is such that both ports on the motor unit are normally at the system pressure and that when a small pressure drop is applied to one or other of these ports the motor's output shaft starts to rotate correspondingly.

In theory, optimum response of the output shaft to a differential pressure swing can be achieved if two conditions in the motor are satisfied; firstly if the motor is frictionless and secondly if there is no fluid leakage. While these conditions can never be perfectly met, improvements can be made and it is with such improvements that the present invention is concerned.

According to the invention there is provided a hydraulic servo system comprising a high pressure fluid source to feed fluid to a servo valve, and a servo motor in fluid communication with said valve so that movement of the valve causes a change of output from the servo motor, the latter comprising a rotor mounted on a pintle having a channel for fluid to provide a hydrostatic bearing between said pintle and said rotor, wherein said channel communicates with the high pressure feed from said source to said valve upstream of said valve.

Figure 3:
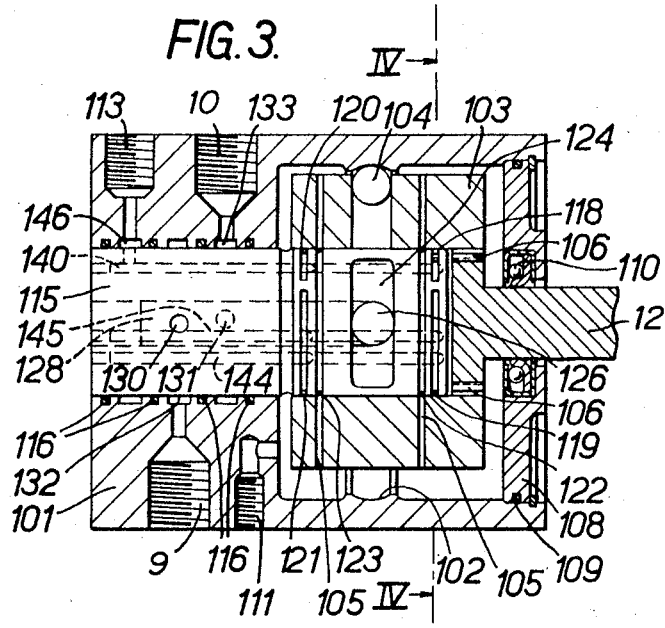
Figure 4:
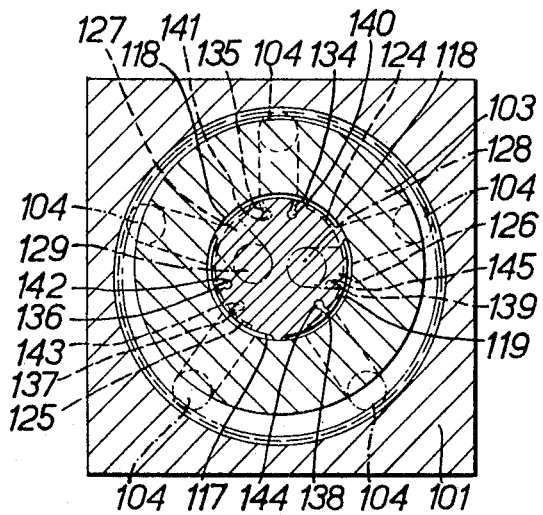

A hydraulic servo system according to the invention will now be described by way of example with reference to the accompanying drawings in which:

FIGURE 1 is a hydraulic block diagram of the system,
FIGURE 2 is a diagram of the input-output characteristics of the system of FIGURE 1,
FIGURE 3 is a section through a servo motor in the system of FIGURE 1,
FIGURE 4 is a section on the line IV—IV of FIGURE 3.

Referring first to FIGURE 1, a servo valve is provided with five ports 2, 3, 4, 5 and 6. The port 4 is a fluid inlet connected to a high pressure fluid source 7. The ports 2 and 6 are exhaust ports connected to a tank 8. The ports 3 and 5 are fluid outlets which communicate respectively with input ports 9 and 10 of a servo motor 11.

The servo motor 11 is provided with an output shaft 12 which is integral with a rotor which is not shown in FIGURE 1 but which will be described subsequently. The rotor is mounted on a stationary pintle, which again is not shown in FIGURE 1, having channels for fluid to provide two sets of hydrostatic bearings 13 and 14 (shown diagrammatically) between the rotor and the pintle. These channels providing the bearings 13 and 14 are connected to the high pressure fluid source 7 on the upstream or high pressure side of the valve 1 by means of a T junction 15.

The valve 1 is a spool valve provided with a movable member in the form of an input operating spindle 16 to which are fixed three spools 17, 18 and 19. In the body of the valve 1 are three annular spaces 20, 21 and 22 with which the ports 2, 4 and 6 respectively communicate. Movement of the spindle 16 in the direction of its length alters the relationship between the fluid pressures effective at the fluid outlets 3 and 5 as follows. In FIGURE 1 the spindle 16 is shown in a position such that the spool 18 is located centrally in relation to the fluid inlet 4 and the spools 17 and 19 are equally displaced from the exhaust ports 2 and 6 respectively, so that the same fluid pressure is effective at each of the outlets 3 and 5. If the spindle 16 were moved upwardly, as viewed in FIGURE 1, from its position shown, the spool 18 would tend to close the communication between the inlet 4 and the space adjacent the outlet 5, and to open the communication between the inlet 4 and the space adjacent the outlet 3. At the same time the spool 19 would tend to open the communication between the space adjacent the outlet 5 and the exhaust port 6, and the spool 17 would tend to close the communication between the space adjacent the outlet 3 and the exhaust port 2. Such increased inlet restriction and decreased exhaust restriction would cause a drop in pressure in the space adjacent the outlet 5 and therefore in the fluid pressure effective at that outlet, and conversely the decreased inlet restriction and increased exhaust restriction would cause a rise in pressure in the space adjacent the outlet 3, and therefore in the fluid pressure effective at that outlet. Similarly, moving the spindle 16 downwardly, as viewed in FIGURE 1, from its position shown would cause a rise in the fluid pressure effective at the outlet 5 and a drop in the fluid pressure effective at the outlet 3. The establishment of a difference between the fluid pressures effective at the outlets 3 and 5 causes the rotor of the servo motor to rotate, and changes in such pressure difference affect rotation of the rotor in a manner explained later.

FIGURE 2 shows the steady state characteristics of a fluid servo system. The X axis 23 shows movement of the valve spindle 16 and the Y axis 24 angular velocity of the output shaft 12. The desired ideal curve is shown as the line 25 while a typical curve of a practical system might be the lines 26, 27 and 28. In the ideal curve the smallest movement of the spindle 16 results in rotation of the shaft 12. In actual systems friction in the motor 11 leads to the lines 27 which are three discontinuities between the lines 26 and 28. In other words small movement of the spindle 16 does not produce corresponding rotation of the output shaft 12. In addition to friction, fluid leakage in the motor 11 can lead to a similar line of discontinuity and in fact, for a practical system, the lines 27 represent the combined effects of friction and leakage. As friction and fluid leakage are reduced so the length of the lines 27 decrease until in the ideal system the ideal line 25 is obtained.

Referring to FIGURE 3, the fluid servo motor 11 comprises a body or housing 101 having an internal groove 102 arranged round and eccentric to a rotor 103. The rotor 103 is provided with five radial cylinders containing ball pistons 104 and rotates within the body 101 in such a way that the pistons 104 move around the groove 102. The rotor 103 is provided with two sets of vent holes 105 and 106 and is formed at its outer end into the output shaft 12 which protrudes through an end plate 108 having a peripheral seal 109 and a rotary shaft seal 110. The body 101 has four fluid connections 11, 9, 113 and 10. A substantially cylindrical pintle 115 is pressed into the body 101, being peripherally sealed therefrom by packings 116, and extends into the rotor 103 to support the latter.

The outer periphery of the pintle 115 is provided with two interrupted circumferential channels or grooves. The channel or groove adjacent the output shaft 107 comprises three parts 117, 118 and 119, all of which can be clearly seen in FIGURE 4. The second channel or groove, adjacent the encastrement of the pintle 115 in the body 101, comprises a further three parts (of which two, 120 and 121, are visible in FIGURE 3) disposed in a similiar manner to the parts 117, 118 and 119 of the first-mentioned channel or groove. These channels or grooves accommodate pools of fluid providing two hydrostatic bearings (namely the bearings generally indicated as 13 and 14 in FIGURE 1) on which the rotor 103 rotates about the pintle 115. Continuous grooves 122 and 123 around the pintle 115 are provided to match up with the vent holes 105 in the rotor 103. Two peripheral openings or ports 124 and 125 in the pintle 115 communicate respectively with the fluid connection input ports 9 and 10 via radial passages 126 and 127, then axial passages 128 and 129, further radial passages 130 and 131, all within the pintle 115, and finally annular spaces 132 and 133. The openings 124 and 125 communicate with the radial cylinders in the rotor 103, each of said cylinders having an inlet port at its radially innermost end, which inlet port communicates with the openings 124 and 125 alternately whenever the rotor is turning. The fluid connection 111 acts as a body vent to tank.

The channels of the two hydrostatic bearings supporting the rotor are disposed on the pintle, one on each side of the openings 124 and 125, and are fed through restrictors 134, 135, 136, 137, 138 and 139 by passages 140, 141, 142, 143, 144 and 145 respectively. In turn all these passages are connected to an annulus 146 communicating with the fluid connection 113 which in turn communicates via an unshown pipe with one arm 15A of the T junction 15 of FIGURE 1, the other arm of which communicates with the inlet 4 of the valve 1 as previously described. The vent holes 105 in the rotor are disposed, in relation to the pintle, between the hydrostatic bearings channels and the openings 124 and 125.

The operation of the motor 101 is generally esentially similar to that of the ball motor disclosed in U.S. application Ser. No. 492,433 filed Oct. 4, 1965 but in the present case friction has been reduced by the inclusion of hydrostatic bearings between the rotor 103 and the pintle 115. The application of different fluid pressures to the openings 124 and 125 respectively, and hence against the ball pistons 104 in the cylinders of the rotor in respective communication with these openings, causes rotation of the rotor due to the eccentricity of the groove 102 against which the pistons bear. Thus, if the fluid pressure applied at the opening 124 is higher than that at the opening 125, the higher pressure applied to the pistons 104 on the right hand side of the rotor as viewed in FIGURE 4, whose cylinders communicate with the opening 124, as opposed to the lower pressure applied to the pistons 104 on the left hand side of the rotor as viewed in FIGURE 4, whose cylinders communiuate with the opening 125, causes clockwise rotation of the rotor (as viewed in FIGURE 4). Conversely, the application of a higher fluid pressure at the opening 125 than that at the opening 124 causes anticlockwise rotation of the rotor (as viewed in FIGURE 4). The speed of rotation is determined by the magnitude of the pressure difference between the openings 124 and 125.

The openings 124 and 125 communicate respectively, as previously described, with the fluid connections 112 and 114, which correspond to the input ports 9 and 10 of FIGURE 1 and are connected to the fluid outlets 3 and 5 of the valve 1. The fluid pressures applied at the openings 124 and 125 are thus determined by the fluid pressures effective at the outlets 3 and 5, which, as explained previously, depend on the setting of the valve 1, which can be altered by movement of the spindle 16.

By feeding the hydrostatic bearings from the high pressure fluid source 7 through one arm of the T junction 15, the other arm of which is connected to the valve inlet 4, any drop in pressure caused by leakage of the bearings, or of the connections to the bearings, is reflected in the high pressure fluid feed to the valve inlet 4 and therefore equally in the fluid pressures effective at the valve outlets 3 and 5. Thus a difference in the fluid pressures effective at these outlets (due to the position of the spindle 16) is not unduly affected by such leakage; such effect as is detectable is equal at the two outlets and the leakage does not affect the setting of the valve 1 at which the pressures at outlets 3 and 5 are equal. Further, the provision of hydrostatic bearings fed with high pressure fluid on the pintle 115 on opposite sides of the openings 124 and 125 tends to reduce fluid leakage from these openings between the rotor and the pintle.

The motor 11, which is somewhat more simple than the hydraulic motor disclosed in my U.S. application Ser. No. 492,433 filed Oct. 4, 1965, now Patent No. 3,361,038; but which operates in generally the same manner, is described above by way of example. It will be appreciated that a motor as described in my U.S. application Ser. No. 492,433 filed Oct. 4, 1965 or any other suitable motor, provided with hydrostatic bearings in accordance with the present invention could be used in the servo system.

What I claim is:

1. A hydraulic servo system comprising a servo motor, a servo valve having a fluid inlet and two fluid outlets and a movable member operative to regulate the difference between the pressures effective at said fluid outlets, a high pressure fluid source, and conduit means between said source and said fluid inlet of said valve and between said fluid outlets of said valve and said motor whereby regulation of said valve controls the output of said servo motor, said motor comprising a pintle and a rotor mounted on said pintle, said pintle having at least one channel therein and further conduit means connecting said channel with said high pressure fluid source to supply high pressure fluid to said channel and provide a hydrostatic bearing between said pintle and said rotor whereby any pressure drop in said hydrostatic bearing will not affect a previously set difference between the pressures effective at said fluid outlets of said valve.

2. A hydraulic servo system as claimed in claim 1 wherein said rotor comprises a plurality of cylinders, said pintle comprises a plurality of openings with which said cylinders communicate, and there are a plurality of channels for fluid to provide hydrostatic bearings between said rotor and said pintle, the channels being located at positions disposed axially along said pintle on opposite sides of said openings.

3. A hydraulic servo system as claimed in claim 2 wherein said rotor has vent holes located between said channels and said openings.

4. A hydraulic servo system as claimed in claim 1 wherein said servo valve is a spool valve.

5. A hydraulic servo system as claimed in claim 1 wherein said servo motor comprises a housing having an internal groove round and eccentric to said rotor, and said rotor has radial cylinders and comprises ball pistons contained in said cylinders and adapted to run in said groove.

6. A hydraulic servo system comprising a servo motor having two fluid input ports and a bearing fluid inlet, a high pressure fluid source, valve means having a fluid inlet communicating with said source, two fluid outlets communicating with said fluid input ports of said servo motor, and a movable valve member operative to regulate the difference between the fluid pressures effective at said fluid outlets, said servo motor comprising a substantially cylindrical pintle having peripheral openings communicating with said input ports, a rotor mounted on said pintle and having radial cylinders which can communicate with said openings and pistons contained in said cylinders, and a housing having an internal groove round and eccentric to said rotor in which said pistons run, so that movement of said valve member effects rotation of said rotor, wherein said pintle has peripheral channels for fluid to provide a hydrostatic bearing between said rotor and said pintle, and said channels communicate through said pintle with said bearing fluid inlet in said motor, and connection means by which said bearing fluid inlet communicates through a path bypassing said valve means with said high pressure fluid source whereby a pressure drop caused by said bearing will not effect said pressure difference between said fluid outlets of said valve means.

7. A hydraulic servo system as claimed in claim 6 wherein said connection means includes a T junction with which said high pressure fluid source communicates and one arm of said T junction communicates with said fluid inlet of said valve means and the other with said bearing fluid inlet of said motor.

8. A hydraulic servo system as claimed in claim 1 wherein said valve means comprises a body having two exhaust ports and a central bore with three annular spaces spaced from each other therealong, the central annular space being connected to said fluid inlet and each of the two end annular spaces being connected to one of said exhaust ports, one of said fluid outlets communicating with a first portion of said bore between the central annular space and one end annular space, and the other of said fluid outlets communicating with a second portion of said bore between the central annular space and the other end annular space, an axially movable spindle in said bore having three spools fixed thereto one in each of said annular spaces, said spools being of substantially the same diameter as said bore and the central spool having a shorter axial length than that of said central annular space, whereby movement of said spindle and said spools in one axial direction increases fluid communication between said central annular space and said first portion of said bore and restricts fluid communication between said central annular space and said second portion of said bore simultaneously with opening of fluid communication between said second portion of said bore and the adjacent end annular space and closing of fluid communication between said first portion of said bore and the other end annular space, while movement in the opposite axial direction increases fluid communication between said central annular space and said second portion of said bore and restricts fluid communication between said central annular space and said first portion of said bore simultaneously with opening of fluid communication between said first portion of said bore and the adjacent end annular space and closing of fluid communication between said second portion of said bore and the other end annular space.

9. A hydraulic servo system as claimed in claim 1 wherein said further conduit means connects said channel with said conduit means at a point between said high pressure fluid source and said valve.

References Cited

UNITED STATES PATENTS

| 2,335,567 | 11/1943 | Kay | 91—448 |
| 3,036,558 | 5/1962 | MacLeod et al. | 91—180 |
| 3,241,463 | 3/1966 | Barrett | 91—205 |
| 3,296,937 | 1/1967 | Guinot | 91—205 |
| 3,354,786 | 11/1967 | Bedford | 91—180 |

FOREIGN PATENTS

| 767,213 | 1/1957 | Great Britain. |
| 580,223 | 10/1924 | France. |

PAUL E. MASLOUSKY, Primary Examiner

U.S. Cl. X.R.

91—205, 448; 92—153